US012752751B2

(12) United States Patent
Lim

(10) Patent No.: US 12,752,751 B2
(45) Date of Patent: Oct. 6, 2026

(54) ELECTRO-MECHANICAL BRAKE AND CONTROL METHOD THEREFOR

(71) Applicant: HYUNDAI MOBIS CO., LTD., Seoul (KR)

(72) Inventor: Dong Hwan Lim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 66 days.

(21) Appl. No.: 18/754,293

(22) Filed: Jun. 26, 2024

(65) Prior Publication Data

US 2025/0074371 A1 Mar. 6, 2025

(30) Foreign Application Priority Data

Sep. 1, 2023 (KR) ........................ 10-2023-0116135

(51) Int. Cl.

*B60T 8/171* (2006.01)
*B60T 8/172* (2006.01)
*F16D 66/00* (2006.01)
*F16D 121/24* (2012.01)

(52) U.S. Cl.

CPC .............. *B60T 8/171* (2013.01); *B60T 8/172* (2013.01); *F16D 66/00* (2013.01); *F16D 2066/003* (2013.01); *F16D 2066/005* (2013.01); *F16D 2121/24* (2013.01)

(58) Field of Classification Search

CPC .......... B60T 8/171; B60T 8/172; F16D 66/00; F16D 2066/003; F16D 2066/005; F16D 2121/24

See application file for complete search history.

(56) References Cited

U.S. PATENT DOCUMENTS

2023/0072101 A1* 3/2023 Lim ...................... F16D 66/026
2023/0365107 A1* 11/2023 Lim ........................ B60T 8/172

* cited by examiner

*Primary Examiner* — Andrew J Cromer
(74) *Attorney, Agent, or Firm* — NovoTechIP International PLLC

(57) ABSTRACT

An electro-mechanical brake includes a piston driven by a motor to push a brake pad toward a wheel disc. The brake also includes: a current detection unit for current flowing through the motor; a piston position detection unit; a map generating unit and a braking force value detection unit. When power is applied to the vehicle at start-up, the first map comprises data correlating current flowing through the motor, position of the piston, and braking force, the second map comprises data of is a map of the current flowing through the motor and a factor are converted into data with reference to the first state, and the factor is a ratio of the braking force to the current flowing through the motor. A braking force value detection detects braking force based on piston position, a current value in the motor, the first map, and the second map.

11 Claims, 8 Drawing Sheets

100

ELECTRO-MECHANICAL BRAKE AND CONTROL METHOD THEREFOR

CROSS-REFERENCE TO RELATED APPLICATIONS

The present application claims priority to Patent Application No. 10-2023-0116135, filed on Sep. 1, 2023 in Korea, the entire contents of which are incorporated herein by reference.

TECHNICAL FIELD

The present disclosure relates to an electro-mechanical brake and a control method therefor.

BACKGROUND

The content described in this section simply provides background information for the present disclosure and does not constitute related art.

An electro-mechanical brake (EMB) is a brake apparatus that generates friction braking force. In the electro-mechanical brake, an actuator driven by a motor is mounted on a brake caliper. The electro-mechanical brake presses a wheel disc using a motor, gear box, screw, piston, brake pad, or the like without a medium called a brake fluid.

The electro-mechanical brake has a similar mechanism to an electronic parking brake (EPB), but since the electro-mechanical brake is a main brake apparatus that is used while traveling, the electro-mechanical brake requires higher reliability and durability.

When a driver steps on a pedal, the electro-mechanical brake calculates a required braking force and applies a brake command to each wheel. When the brake command is applied, a motor starts to rotate to move a piston forward, and the piston presses a brake pad. The brake pad presses the wheel disc so that the braking force is generated.

An electro-mechanical brake (EMB) of the related art measures the braking force using a force sensor and controls the braking force. The force sensor mounted on the electro-mechanical brake is expensive. In addition, the force sensor has a disadvantage that the force sensor does not accurately measure the braking force depending on a mounting position of the force sensor. To overcome such disadvantages, a force sensorless system is used.

The force sensorless system refers to a system that estimates braking force without using a force sensor. An electro-mechanical brake having a force sensorless system applied thereto perform calibration. Here, the calibration refers to a process of setting the electro-mechanical brake. The electro-mechanical brakes can perform the calibration to ascertain a braking force value corresponding to a position of the piston. A map in which the braking force value corresponding to the position of the piston is indexed is called a force map. With the force map, the electro-mechanical brake can ascertain without the force sensor and adjust the braking force.

Since a state of the electro-mechanical brake such as wearing of the brake pad changes with use, the calibration must be performed each time the vehicle is used to update information on the electro-mechanical brake. The calibration is preferably performed before driving starts. For example, when the driver opens a door of the vehicle or starts up the vehicle, the calibration can be performed and the force map can be generated.

That is, the electro-mechanical brake using the force sensorless system can perform the calibration to ascertain a current state of the electro-mechanical brake and generate data for estimation of the braking force. It is important to end the calibration quickly. This is because the driver can drive after the calibration is completed.

The calibration is usually performed only when the driver opens the door or starts up the vehicle. It is not preferable to perform the calibration during traveling. This is because a process of performing the calibration includes a process of driving a motor to move the piston and the brake pad, and a process of generating braking force. When the calibration is performed regardless of the driver's will during traveling, the driver may feel uncomfortable in braking, and a traffic accident may occur.

A force map generated when the driver opens the door or starts up the vehicle reflects only a state of the electro-mechanical brake at a point in time when the force map is generated. The force map does not reflect, in real time, a state of the electro-mechanical brake changing due to braking performed during traveling. For example, when braking is performed during traveling, the brake pad may wear and stiffness of the brake pad may change. Thus, when the state of the electro-mechanical brake is different from a state at a point in time when the force map is generated due to braking performed during traveling, a method of accurately estimating the braking force without performing additional calibration is required. This is because it is not preferable to perform the calibration during driving as described above. That is, a method capable of accurately estimating the braking force during driving is required.

SUMMARY

The present disclosure is intended to solve these problems, and a main object of the present disclosure is to provide a method capable of accurately detecting braking force without performing additional calibration when a state of an electro-mechanical brake changes from a state before traveling due to braking performed during traveling.

As described above, according to the present embodiment, there is an effect that the electro-mechanical brake can accurately detect an actual braking force value without performing additional calibration after stopping a vehicle when a state of the electro-mechanical brake changes from a state before traveling due to braking performed during traveling.

DETAILED DESCRIPTION

Figure 1:
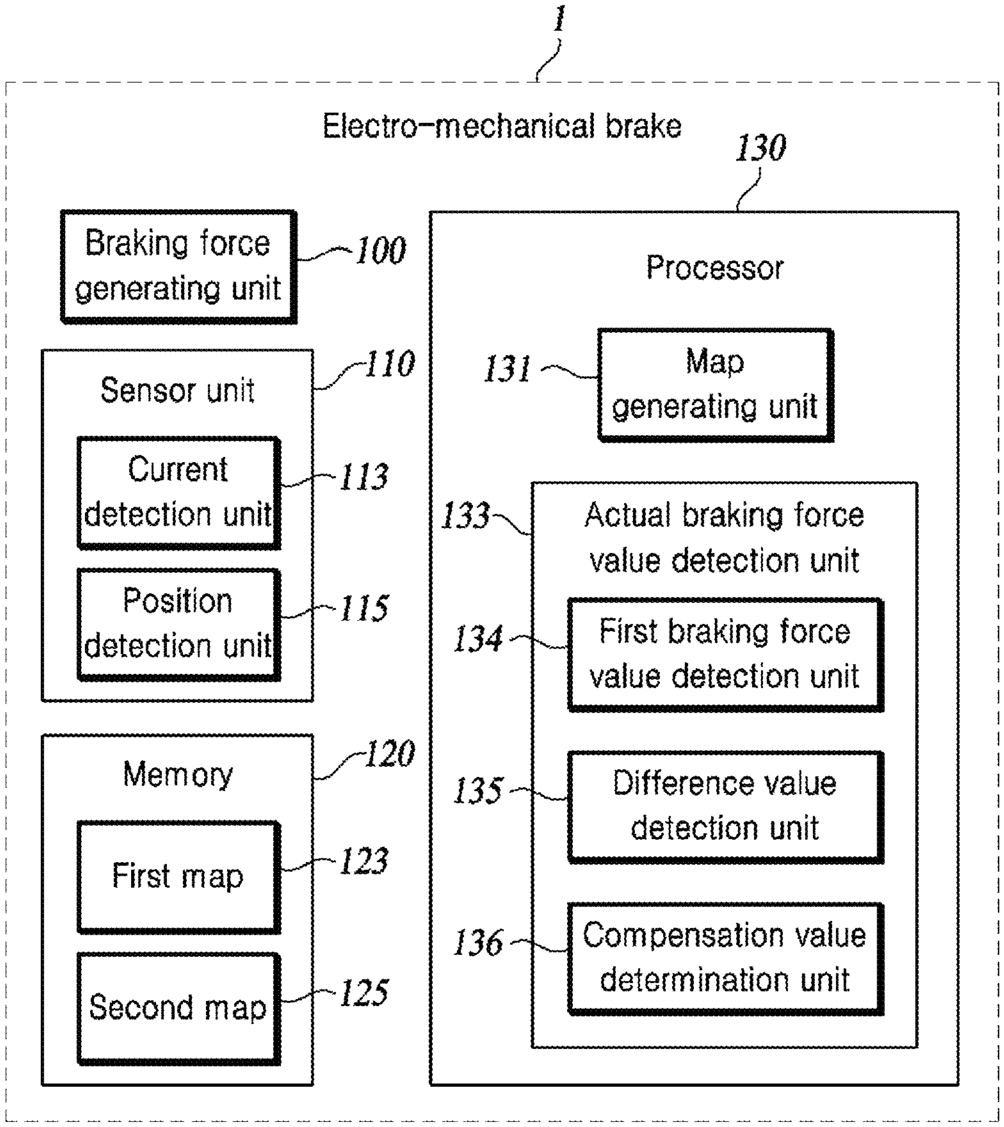
FIG. 1 is a functional block diagram of an electro-mechanical brake according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

FIG. 1 is a functional block diagram of an electro-mechanical brake according to an embodiment of the present disclosure.

Figure 2:
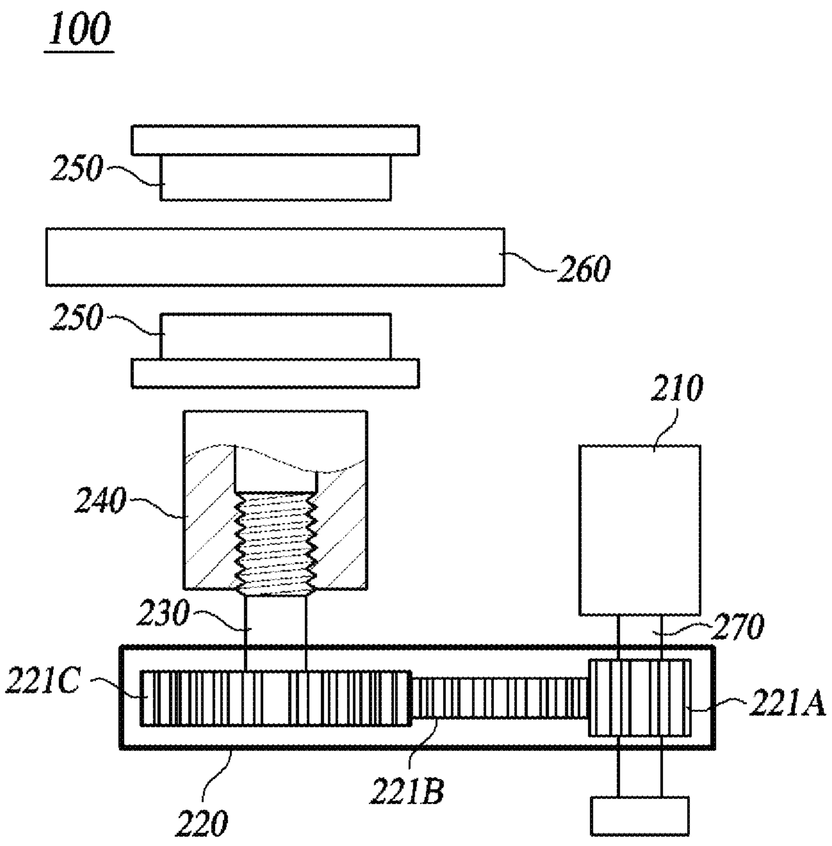
FIG. 2 is a diagram illustrating a braking force generating unit according to an embodiment of the present disclosure.

FIG. 2 is a diagram illustrating a braking force generating unit according to an embodiment of the present disclosure.

Referring to FIGS. 1 and 2, an electro-mechanical brake (EMB) 1 includes all or some of a braking force generating unit 100, a sensor unit 110, a memory 120, and a processor 130. The electro-mechanical brake 1 generates friction braking force. Since the electro-mechanical brake 1 does not use hydraulic pressure, the electro-mechanical brake 1 has a higher response speed and is more environmentally friendly than a hydraulic brake (not illustrated). The electro-mechanical brake 1 allows independent control of each wheel (not illustrated), resulting in high braking stability.

When the driver steps on a brake pedal (not illustrated), the braking force generating unit 100 calculates required braking force on the basis of a stroke of a driver and then generates the braking force. The braking force generating unit 100 may be mounted on a wheel of a vehicle to generate the braking force. The braking force generating unit 100 may be mounted on each wheel of the vehicle. The braking force generating unit 100 is capable of independent braking force generation and independent control for each wheel. The braking force generating unit 100 uses friction force to change kinetic energy of the vehicle into heat energy to brake the vehicle.

The braking force generating unit 100 may include all or some of a motor 210, a gear box 220, a power transfer unit 230, a piston 240, a brake pad 250, a rotation shaft 270, and a wheel disc 260. The braking force generating unit 100 is not limited by the disclosure of the drawings. For example, a shape, size, and disposition of the motor 210, the gear box 220, the power transfer unit 230, the piston 240, the brake pad 250, the rotation shaft 270, and the wheel disc 260 are not limited by the disclosure of the drawings.

The motor 210 rotates to move the piston 240. A direction of the piston 240 that is used in the present specification is defined. Forward movement means that the piston 240 moves toward the wheel disc 260. Backward movement means that the piston 240 moves in a direction away from the wheel disc 260.

According to an embodiment, the motor 210 is a direct current motor (DC Motor), an alternating current motor (AC Motor), an induction motor, a synchronous motor, a step motor, a servo motor, a brushless direct current motor (BLDC motor), a linear motor, a permanent magnet synchronous motor (PMSM), or the like.

One side of the gear box 220 is connected to the motor 210, and the other side of the gear box 220 is connected to the power transfer unit 230. The gear box 220 is configured to transfer power of the motor 210 to the power transfer unit 230. The gear box 220 includes a plurality of gears 221 therein. In the gear box 220, the plurality of gears 221 are engaged and rotated so that rotational force is amplified. A shape and disposition of the gear box 220 are not limited by the drawings. Each of the plurality of gears 221 is not limited to the shape and number illustrated in the drawings.

The power transfer unit 230 may receive the power from the gear box 220. The power transfer unit 230 may provide the power to the piston 240.

According to an embodiment, the power transfer unit 230 may be a screw shaft. In this case, the piston 240 may be screw-coupled to the screw shaft. In this case, when the screw shaft rotates, the screw coupling is connected or disconnected, and the piston 240 moves forward or backward.

The piston 240 moves by receiving the power transferred from the power transfer unit 230. When the piston 240 moves forward, the piston 240 presses the brake pad 250. The brake pad 250 brakes the vehicle by pressing the rotating wheel disc 260.

There may be a pair of brake pads 250. The pair of brake pads 250 may be disposed on both sides of the wheel disc 260. The wheel disc 260 is coupled to the wheel of the vehicle and rotates with the wheel. When the piston 240 presses the brake pad 250, the brake pad 250 can press the wheel disc 260. When the brake pad 250 presses the wheel disc 260, the brake pad 250 is compressed and the braking force is generated. Since force with which the brake pad 250 presses the wheel disc 260 increases as a forward movement distance of the piston 240 increases, the braking force increases.

The sensor unit 110 may include a current detection unit 113 and a position detection unit 115.

According to an embodiment, the current detection unit 113 may include a current sensor (not illustrated) to detect a current flowing through the motor 210. The electro-mechanical brake 1 can control the current flowing through the motor 210 using the current detection unit 113.

According to an embodiment, the position detection unit 115 may include a motor rotation angle sensor (not illustrated) to detect the rotation angle of the motor 210. As the motor 210 rotates, the piston 240 moves forward or backward. That is, since a position of the piston 240 is determined from the rotation angle of the motor 210, the electro-mechanical brake 1 may detect the position of the piston 240 using the position detection unit 115 including the motor rotation angle sensor.

A state of the electro-mechanical brake 1 used in the present specification will be defined. A first state refers to a state of the electro-mechanical brake 1 when power is applied to the vehicle due to start-up. That is, the first state is a state when no traveling or braking is performed. When the braking is performed during traveling, the state of the electro-mechanical brake 1 may change from the first state. For example, when the brake pad 250 wears, a physical property of the brake pad 250 may change. That is, stiffness of the brake pad 250 can change.

Figure 3:
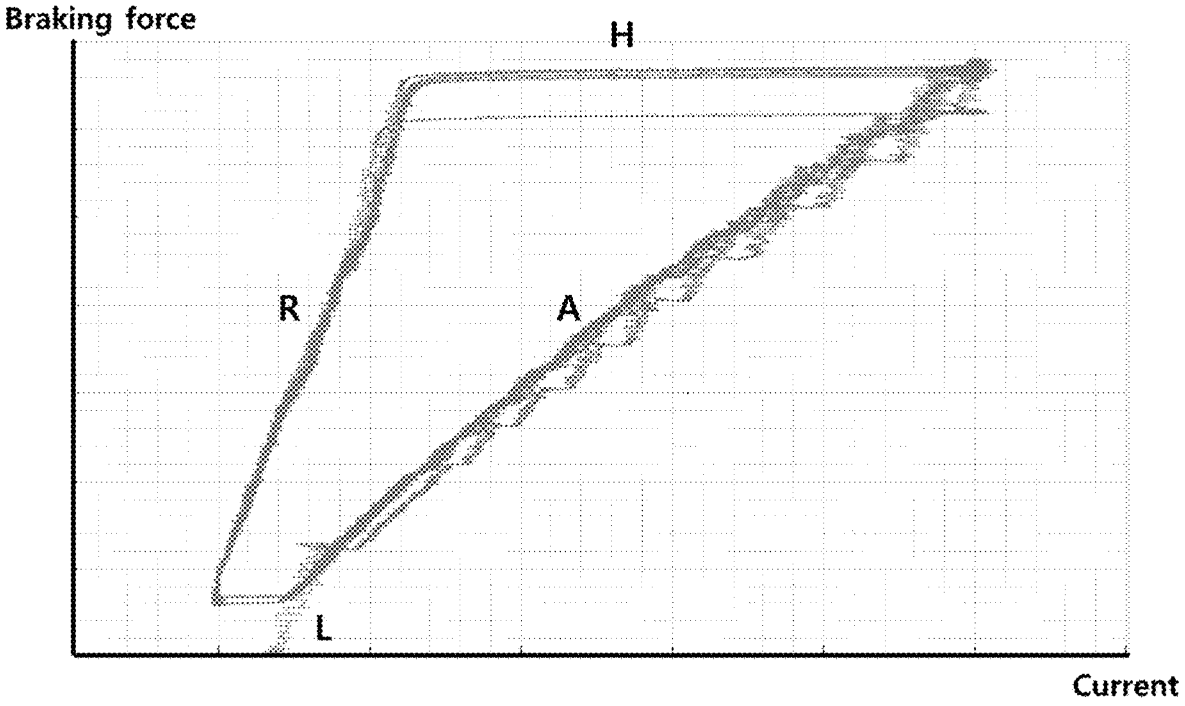
FIG. 3 is a graph illustrating a relationship between a current flowing through a motor and braking force according to an embodiment of the present disclosure.

FIG. 3 is a graph illustrating a relationship between a current flowing through the motor and braking force according to an embodiment of the present disclosure.

Referring to FIG. 3, an x-axis on the graph represents the current flowing through the motor 210, and a y-axis on the graph represents the braking force of the electro-mechanical brake 1. Respective sections on the graph of FIG. 3 will be described. Section A is a section in which the brake is applied, and is a section in which the driver steps on the brake pedal to increase the braking force. A section H is a section in which the driver holds a state in which the driver steps on the brake pedal, and is a section in which the braking force remains substantially constant. A section R is a section in which the driver releases the brake pedal and is a section in which the braking force rapidly decreases. A section L is a section in which the braking force is too low to detect the braking force.

The section A will be described in greater detail. The section A is a section in which the piston 240 is moved forward by the motor 210 and the piston 240 that has been moved forward presses the brake pad 250. The section A is a section in which the brake pad 250 moves forward to press the wheel disc 260 and generate the braking force. The section A is a section in which the braking force increases linearly as the current increases. The position of the piston 240 when the piston 240 starts to move forward using the motor 210 and the brake pad 250 and the wheel disc 260 spaced apart from each other start to come into contact with each other is referred to as a contact point. In the section A, a magnitude of the current flowing through the motor 210 increases as the piston 240 moves forward. As the piston 240 moves further away from the contact point, the magnitude of the current increases. The electro-mechanical brake 1 according to the present disclosure may detect a current value for the position of the piston 240, convert a correlation between the position of the piston 240, the current flowing through the motor 210, and the braking force into data, and generate a first map 123 and/or a second map 125. This will be described in greater detail with reference to FIG. 4.

Figure 4:
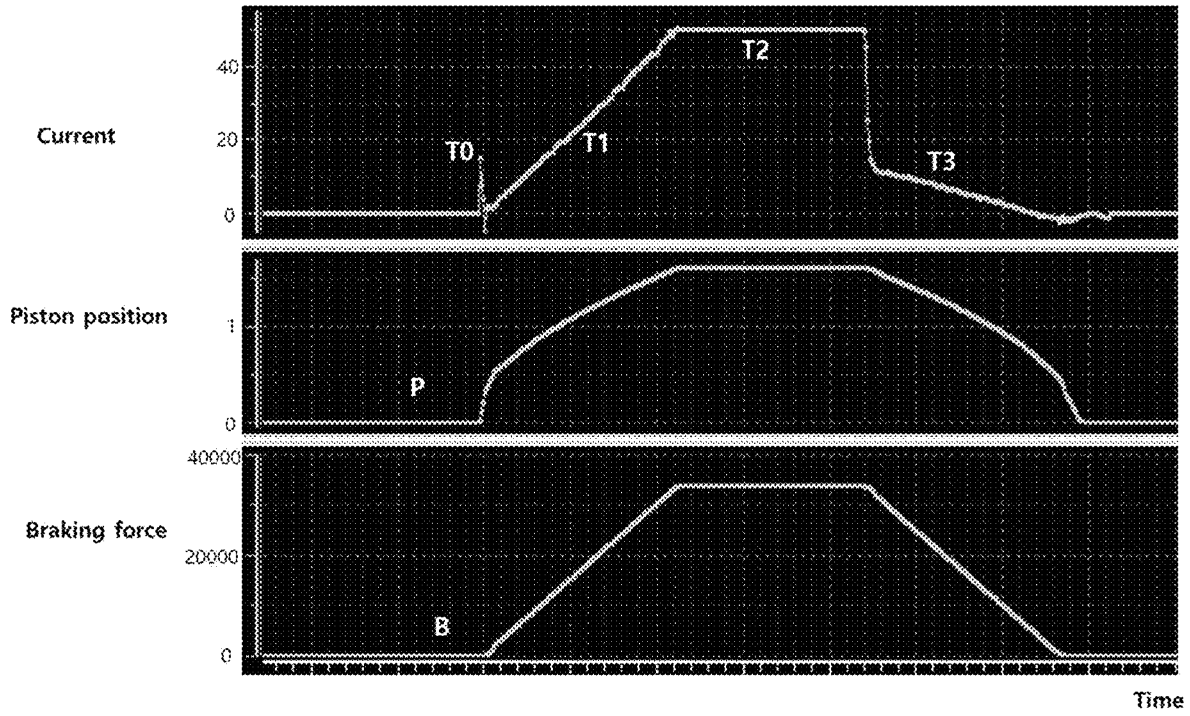
FIG. 4 is a diagram illustrating data that the electro-mechanical brake collects to generate a first map and/or a second map according to an embodiment of the present disclosure.

FIG. 4 is a diagram illustrating data that the electro-mechanical brake collects to generate a first map and/or a second map according to an embodiment of the present disclosure.

Referring to FIG. 4, an x-axis represents time, and a y-axis represents the current flowing through the motor 210, the position of the piston 240, and braking force by the electro-mechanical brake 1. When the electro-mechanical brake 1 according to the present disclosure is in the first state, the electro-mechanical brake 1 can generate the first map 123 and/or the second map 125. In order to generate the first map 123 and/or the second map 125, the electro-mechanical brake 1 collects data regarding the current flowing through the motor 210, the position of the piston 240, and the braking force when the electro-mechanical brake 1 is in the first state.

In order to collect data regarding the current flowing through the motor 210, the position of the piston 240, and the braking force, the electro-mechanical brake 1 can perform RAMP control. Here, the RAMP control means performing control so that the current flowing through the motor 210 and/or the position of the piston 240 gradually increase in the first state. When STEP control for rapidly changing the position of the piston 240 is performed, a current according to the position of the piston 240 cannot be accurately measured, and thus, the electro-mechanical brake 1 according to the present disclosure performs the RAMP control to collect the data regarding the current flowing through the motor 210, the position of the piston 240, and the braking force. In the RAMP control, an inrush current TO is generated at a moment when the brake pad 250 comes into contact into the wheel disc 260 and the braking force is generated. Referring to a section TI of FIG. 4, the current and the braking force increase as the piston 240 moves forward.

The electro-mechanical brake 1 can collect data in the TI section in which the current flowing through the motor 210, the position of the piston 240, and the braking force increase with time. The electro-mechanical brake 1 may generate the first map 123 and/or the second map 125 on the basis of the collected data.

In a process of collecting data, the current flowing through the motor 210 can be detected using the current detection unit 113, and the position of the piston 240 can be detected using the position detection unit 115. As described in FIG. 3, when the electro-mechanical brake 1 is applied, the braking force increases linearly as the current flowing through the motor 210 increases, and thus, when the current flowing through the motor 210 is detected, a braking force value corresponding to the current value can be estimated.

The first map 123 and/or the second map 125 may be stored in the memory 120. The first map 123 is a map in which a correlation among the current flowing through the motor 210, the position of the piston 240, and braking force is converted into data with reference to the first state. The second map 125 is a map in which the current flowing through the motor 210 and a factor are converted into data with reference to the first state. The factor is a ratio of the braking force to the current flowing through the motor 210. That is, the factor is the braking force divided by the current.

TABLE 1

| Piston position | Braking force | Current |
|---|---|---|
| 0 | 0 | 0.1 |
| 0.29 | 0 | 0.2 |
| 0.3 | 0 | 0.3 |
| 0.35 | 204 | 0.8 |
| 0.4 | 424 | 0.9 |
| 0.45 | 862 | 1 |
| 0.5 | 1472 | 1.6 |
| 0.55 | 2254 | 2.6 |
| 0.6 | 3302 | 3.85 |
| 0.65 | 4382 | 5 |
| 0.7 | 5556 | 7.1 |
| 0.75 | 6746 | 8.3 |
| 0.8 | 7966 | 10.1 |

TABLE 1-continued

| Piston position | Braking force | Current |
|---|---|---|
| 0.85 | 9234 | 11.8 |
| 0.9 | 10534 | 13.6 |
| 0.95 | 11832 | 15.5 |
| 1 | 13210 | 17.1 |
| 1.05 | 14618 | 19 |
| 1.1 | 16058 | 21.8 |
| 1.15 | 17528 | 23.7 |
| 1.2 | 19046 | 25.9 |
| 1.25 | 20674 | 28.8 |
| 1.3 | 22302 | 30.7 |
| 1.35 | 23976 | 34.5 |
| 1.4 | 25776 | 36.9 |
| 1.45 | 27560 | 39.3 |
| 1.5 | 29314 | 41.7 |
| 1.55 | 31128 | 44.2 |
| 1.6 | 32948 | 46.8 |

Table 1 shows an example of the first map 123 generated on the basis of the data collected by performing the RAMP control. According to an embodiment, the first map 123 may be a look-up table. When the first map 123 is a look-up table, an output value can be obtained quickly. For example, when a position value of 0.55 of the piston 240 is input to the first map 123, a current value of 2.6 and a braking force value of 2254 corresponding to the position value of 0.55 of the piston 240 can be quickly output.

TABLE 2

| Piston position | Braking force | Current | Factor |
|---|---|---|---|
| 0 | 0 | 0.1 | 0 |
| 0.29 | 0 | 0.2 | 0 |
| 0.3 | 0 | 0.3 | 0 |
| 0.35 | 204 | 0.8 | 255 |
| 0.4 | 424 | 0.9 | 471 |
| 0.45 | 862 | 1 | 862 |
| 0.5 | 1472 | 1.6 | 920 |
| 0.55 | 2254 | 2.6 | 867 |
| 0.6 | 3302 | 3.85 | 858 |
| 0.65 | 4382 | 5 | 876 |
| 0.7 | 5556 | 7.1 | 783 |
| 0.75 | 6746 | 8.3 | 813 |
| 0.8 | 7966 | 10.1 | 789 |
| 0.85 | 9234 | 11.8 | 783 |
| 0.9 | 10534 | 13.6 | 775 |
| 0.95 | 11832 | 15.5 | 763 |
| 1 | 13210 | 17.1 | 773 |
| 1.05 | 14618 | 19 | 769 |
| 1.1 | 16058 | 21.8 | 737 |
| 1.15 | 17528 | 23.7 | 740 |
| 1.2 | 19046 | 25.9 | 735 |
| 1.25 | 20674 | 28.8 | 718 |
| 1.3 | 22302 | 30.7 | 726 |
| 1.35 | 23976 | 34.5 | 695 |
| 1.4 | 25776 | 36.9 | 699 |
| 1.45 | 27560 | 39.3 | 701 |
| 1.5 | 29314 | 41.7 | 703 |
| 1.55 | 31128 | 44.2 | 704 |
| 1.6 | 32948 | 46.8 | 704 |

Table 2 illustrates an example of the second map 125 generated on the basis of the data collected by performing the RAMP control. The factor in Table 2 is the braking force divided by the current flowing through the motor 210. The factor may be used to detect accurate actual braking force when the state of the electro-mechanical brake 1 changes from the first state. According to an embodiment, the second map 125 may be a look-up table. When the second map 125 is the look-up table, the output value can be obtained quickly. For example, when the current value of 2.6 flowing through the motor 210 is input to the second map 125, a factor value of 867 corresponding to the current value of 2.6 can be quickly output.

The processor 130 may include a map generating unit 131 and an actual braking force value detection unit 133.

The map generating unit 131 may generate the first map 123 in the first state. Since the first map 123 is the map in which the correlation among the current flowing through the motor 210, the position of the piston 240, and braking force is converted into data with reference to the first state, it is preferable for the first map 123 to be generated before the traveling of the vehicle starts. This is because, when driving or braking is performed, the state of the electro-mechanical brake 1 changes from the first state. According to an embodiment, the map generating unit 131 may start to generate the first map 123 from a moment when a user opens a door of the vehicle. According to an embodiment, the map generating unit 131 may start to generate the first map 123 immediately after power is applied to the vehicle due to start-up.

The map generating unit 131 may generate the second map 125 in the first state. Since the second map 125 is a map in which the factor which is a ratio of the braking force to the current flowing through the motor 210 is converted into data with reference to the first state, it is preferable for the second map 125 to be generated before the vehicle starts to travel. This is because, when driving or braking is performed, the state of the electro-mechanical brake 1 changes from the first state. According to an embodiment, the map generating unit 131 may start to generate the second map 125 from a moment when the user opens the door of the vehicle. According to an embodiment, the map generating unit 131 may start to generate the second map 125 immediately after power is applied to the vehicle due to start-up.

When braking is performed during traveling, the actual braking force value detection unit 133 may detect the actual braking force value on the basis of an actual piston position, an actual current value, the first map 123, and the second map 125. The actual piston position refers to an actual position of the piston 240 detected by the position detection unit 115 when braking is performed during traveling. The actual current value refers to a value of an actual current flowing through the motor 210 detected by the current detection unit 113 when braking is performed during traveling. The actual braking force value refers to a value of actual braking force generated by the electro-mechanical brake 1 when braking is performed during traveling.

The electro-mechanical brake 1 of the related art without a force sensor estimates the braking force with reference to the first state. Since the state of the electro-mechanical brake 1 continuously changes from the first state due to braking performed during traveling, the electro-mechanical brake 1 of the related art has a disadvantage that the accuracy of the detected actual braking force value decreases as traveling continues.

The electro-mechanical brake 1 according to the present disclosure can overcome disadvantages of the electro-mechanical brake of the related art. Specifically, the actual braking force value detection unit 133 can accurately detect the actual braking force value even when the state of the electro-mechanical brake 1 is not the first state. That is, even when the state of the electro-mechanical brake 1 continuously changes due to braking performed during traveling, the electro-mechanical brake 1 can accurately detect the actual braking force value.

The actual braking force value detection unit 133 includes all or some of a first braking force value detection unit 134, a difference value detection unit 135, and a compensation value determination unit 136.

The first braking force value detection unit 134 determines a first braking force value on the basis of the actual piston position detected by the position detection unit 115 and the first map 123. Specifically, the first braking force value detection unit 134 determines a value of the braking force output when the actual piston position is input to the first map 123, as the first braking force value.

When the electro-mechanical brake 1 performs braking, the state of the electro-mechanical brake 1 changes from the first state, and thus, the first braking force value detected by the first braking force value detection unit 134 is different from the actual braking force value generated by the electro-mechanical brake 1. The electro-mechanical brake 1 according to the present disclosure compensates for the first braking force value to detect the actual braking force value. This will be described below.

The difference value detection unit 135 detects a difference between the actual current value detected by the current detection unit 113 and the first current value. The first current value refers to a value of a current that is output when the actual piston position detected by the position detection unit 115 is input to the first map 123.

The compensation value determination unit 136 determines the difference value multiplied by a first factor value as a compensation value. The first factor value refers to a value of a factor output when the actual current value detected by the current detection unit 113 is input to the second map 125. The compensation value may be used for accurate detection of the actual braking force value in a state other than the first state.

In a case in which the braking is performed during traveling and the state of the electro-mechanical brake 1 changes from the first state, the actual braking force value detection unit 133 may detect a sum of the compensation value and the first braking force value as the actual braking force value generated by the electro-mechanical brake 1. Here, the case in which the braking is performed during traveling and the state of the electro-mechanical brake 1 changes from the first state may be a case in which a temperature of the brake pad 250 changes and a volume of the brake pad 250 changes, or a case in which the brake pad 250 wears. Thus, the electro-mechanical brake 1 according to the present disclosure can accurately detect the actual braking force value even when the state of the electro-mechanical brake 1 changes from the first state due to braking performed during traveling.

Figure 5:
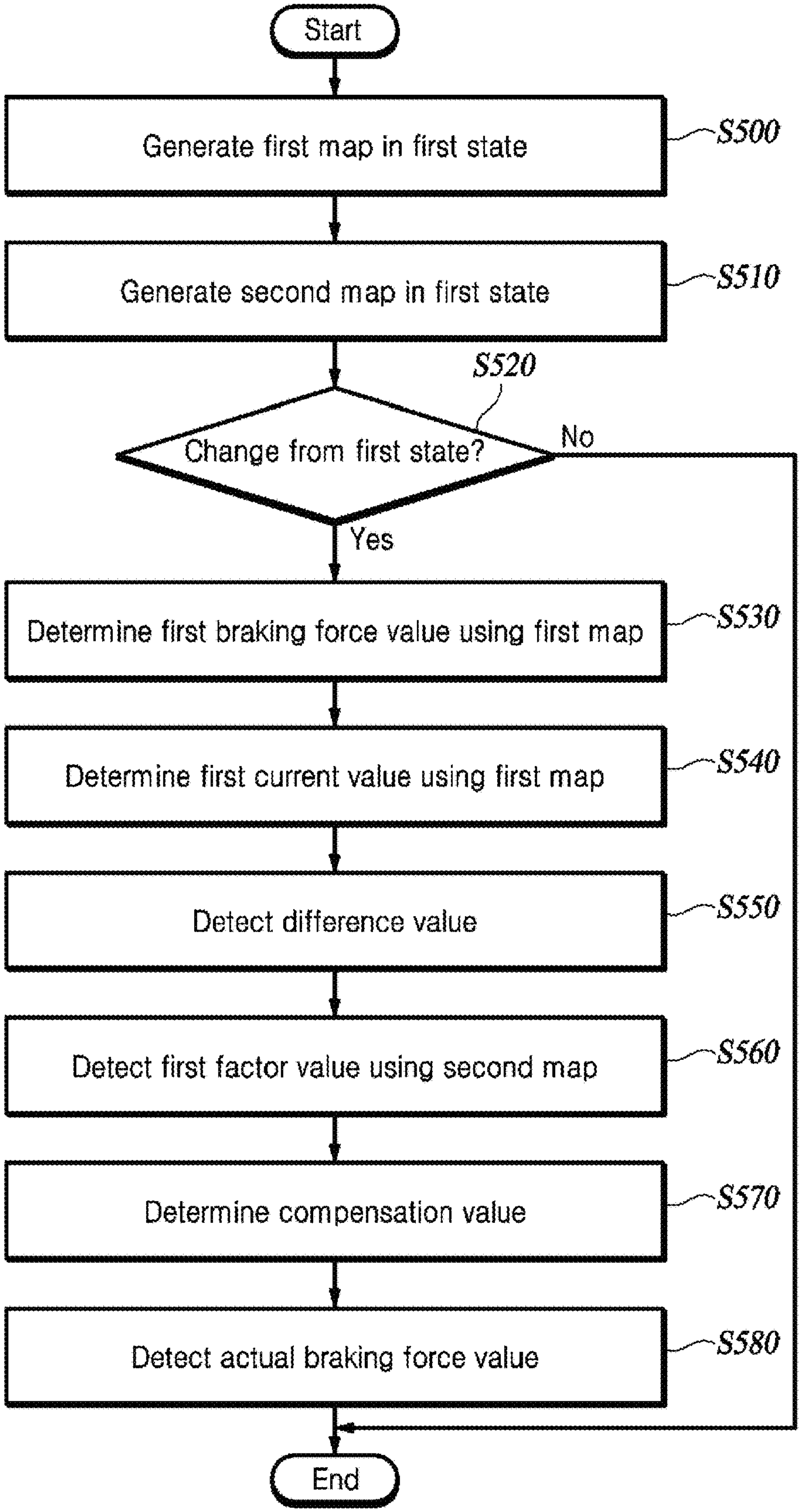
FIG. 5 is a flowchart illustrating a control method for an electro-mechanical brake according to an embodiment of the present disclosure.

FIG. 5 is a flowchart illustrating a control method for an electro-mechanical brake according to an embodiment of the present disclosure.

Referring to FIG. 5, the electro-mechanical brake 1 according to an embodiment of the present disclosure may generate the first map 123 in the first state (S500). The electro-mechanical brake 1 may generate the second map 125 in the first state (S510). According to an embodiment, steps S500 and S510 may be performed simultaneously. According to an embodiment, the electro-mechanical brake 1 may start to generate the first map 123 and the second map 125 from a moment when the user opens the door of the vehicle in order to complete the generation of the first map 123 and the second map 125 before traveling starts. According to an embodiment, the electro-mechanical brake 1 may start to generate the first map 123 and the second map 125 from a moment when power is applied to the vehicle due to start-up.

According to an embodiment, the electro-mechanical brake 1 may decide whether the state of the electro-mechanical brake 1 has changed from the first state (S520). When the state of the electro-mechanical brake 1 is the first state, the electro-mechanical brake 1 may detect the actual braking force value on the basis of the first map 123. Among the steps disclosed in FIG. 5, step S520 may not be performed and may be omitted.

The electro-mechanical brake 1 may determine the first braking force value using the first map 123 (S530). Specifically, when braking is performed during traveling, the electro-mechanical brake 1 detects the actual piston position. The electro-mechanical brake 1 may determine the value of the braking force output when the detected actual piston position is input to the first map 123, as the first braking force value.

The electro-mechanical brake 1 can determine the first current value using the first map 123 (S540). Specifically, when braking is performed during traveling, the electro-mechanical brake 1 detects the actual piston position. The electro-mechanical brake 1 may determine a value of the current output when the detected actual piston position is input to the first map 123, as the first current value. Steps S530 and S540 may be performed simultaneously.

The electro-mechanical brake 1 can detect the difference value (S550). The difference value refers to a difference value between the actual current value detected by the current detection unit 113 and the first current value. When the actual current value is greater than the first current value, this means that the stiffness of the brake pad 250 increases. When the actual current value is smaller than the first current value, this means that the stiffness of the brake pad 250 is reduced. Thus, the electro-mechanical brake 1 according to the present disclosure can decide whether the stiffness of the brake pad 250 has increased or decreased depending on the difference value between the actual current value and the first current value.

The electro-mechanical brake 1 can detect the first factor value using the second map 125 (S560). Specifically, the value of the factor that is output when the actual current value detected by the current detection unit 113 is input to the second map 125 may be determined as the first factor value.

The electro-mechanical brake 1 may determine the compensation value (S570). Specifically, the difference value multiplied by the first factor value may be determined as the compensation value. The electro-mechanical brake 1 can accurately detect the actual braking force value by using the compensation value even when the electro-mechanical brake 1 is not in the first state.

The electro-mechanical brake 1 can detect the actual braking force value (S580). Specifically, the sum of the compensation value and the first braking force value may be detected as the actual braking force value generated by the electro-mechanical brake 1.

Thus, the electro-mechanical brake 1 according to the present disclosure can accurately detect the actual braking force value without a force sensor, and can accurately adjust the braking force on the basis of the detected actual braking force value. In the electro-mechanical brake 1 according to the present disclosure, the braking force can be accurately adjusted for a stable vehicle behavior, and uncomfortable braking can be reduced for provision of a high-quality user experience.

The electro-mechanical brake 1 according to the present disclosure can accurately detect the braking force in a state other than the first state, unlike an electro-mechanical brake of the related art in which the accuracy of the detected braking force decreases as the state changes due to traveling and braking. The electro-mechanical brake 1 according to the present disclosure can accurately detect the braking force even when calibration cannot be performed due to traveling.

Figure 6:
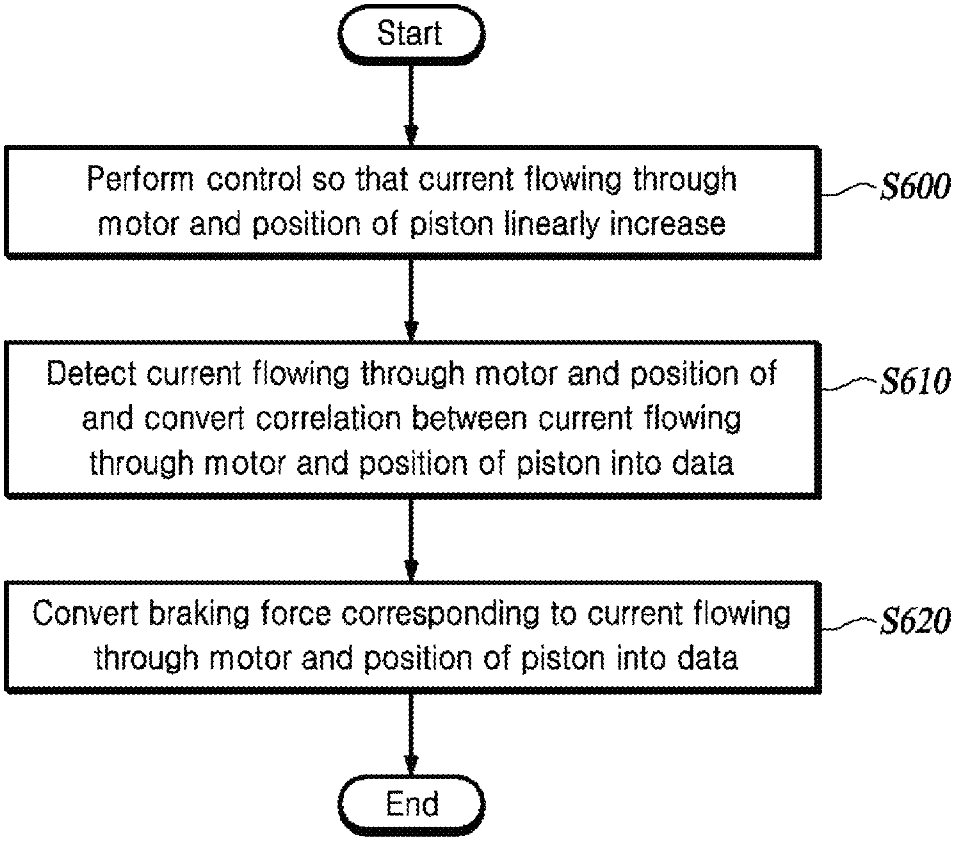
FIG. 6 is a flowchart illustrating a process of generating the first map according to an embodiment of the present disclosure.

FIG. 6 is a flowchart illustrating a process of generating the first map according to an embodiment of the present disclosure.

Referring to FIG. 6, the electro-mechanical brake 1 according to the present disclosure may perform control so that the current flowing through the motor 210 and/or the position of the piston 240 linearly increases (S600). For example, RAMP control for linearly increasing the current flowing through the motor 210 or RAMP control for linearly increasing the position of the piston 240 can be performed. When the RAMP control is performed, the current flowing through the motor 210 can be stably measured. According to an embodiment, the electro-mechanical brake 1 may perform control so that the current flowing through the motor 210 and/or the position of the piston 240 gradually increases. In this case, the current and/or the position of the piston 240 may increase linearly or non-linearly.

The electro-mechanical brake 1 can detect the current flowing through the motor 210 and the position of the piston 240 while step S600 is performed, and convert a correlation between the current flowing through the motor 210 and the position of the piston 240 into data (S610).

The electro-mechanical brake 1 can convert braking force corresponding to the current flowing through the motor 210 and the position of the piston 240 into data (S620). In a section in which the electro-mechanical brake 1 is applied (section TI in FIG. 4), the current flowing through the motor 210 and the braking force are in a linear relationship, and thus, when a current value flowing in the motor 210 is detected, the braking force corresponding to the current value can be detected.

The electro-mechanical brake 1 may generate the first map 123 and/or the second map 125 using data acquired in steps S600 to S620.

Figure 7:
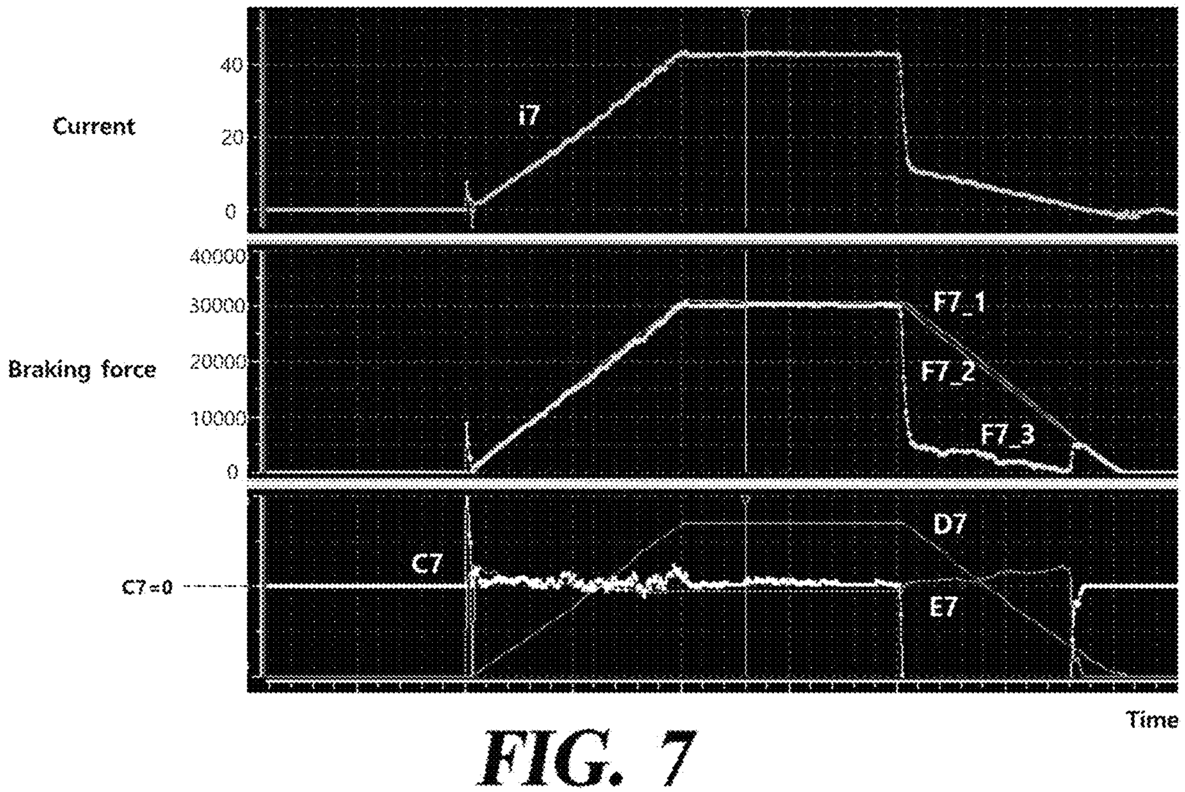
FIG. 7 is a graph illustrating test results when the brake pad is in a full pad state in which the brake pad does not wear according to an embodiment of the present disclosure.

FIG. 7 is a graph illustrating test results when the brake pad is in a full pad state in which the brake pad does not wear according to an embodiment of the present disclosure.

Figure 8:
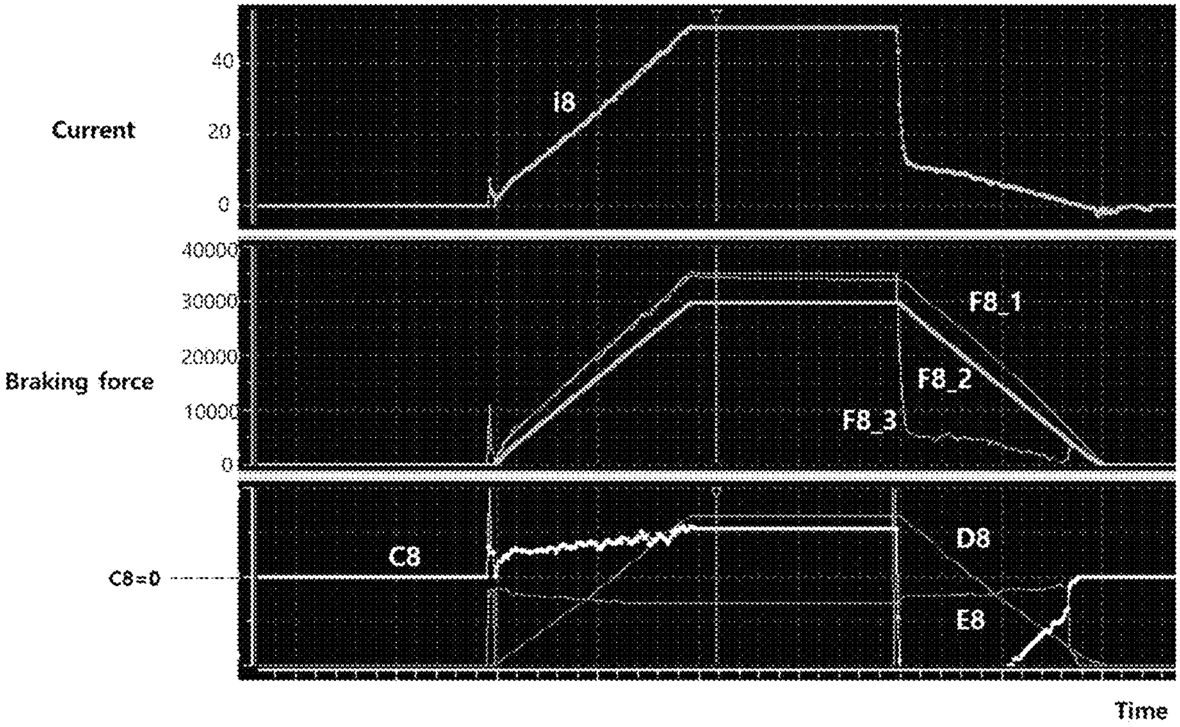
FIG. 8 is a graph illustrating test results when the brake pad is in an expanded state according to an embodiment of the present disclosure.

FIG. 8 is a graph illustrating test results when the brake pad is in an expanded state according to an embodiment of the present disclosure.

Figure 9:
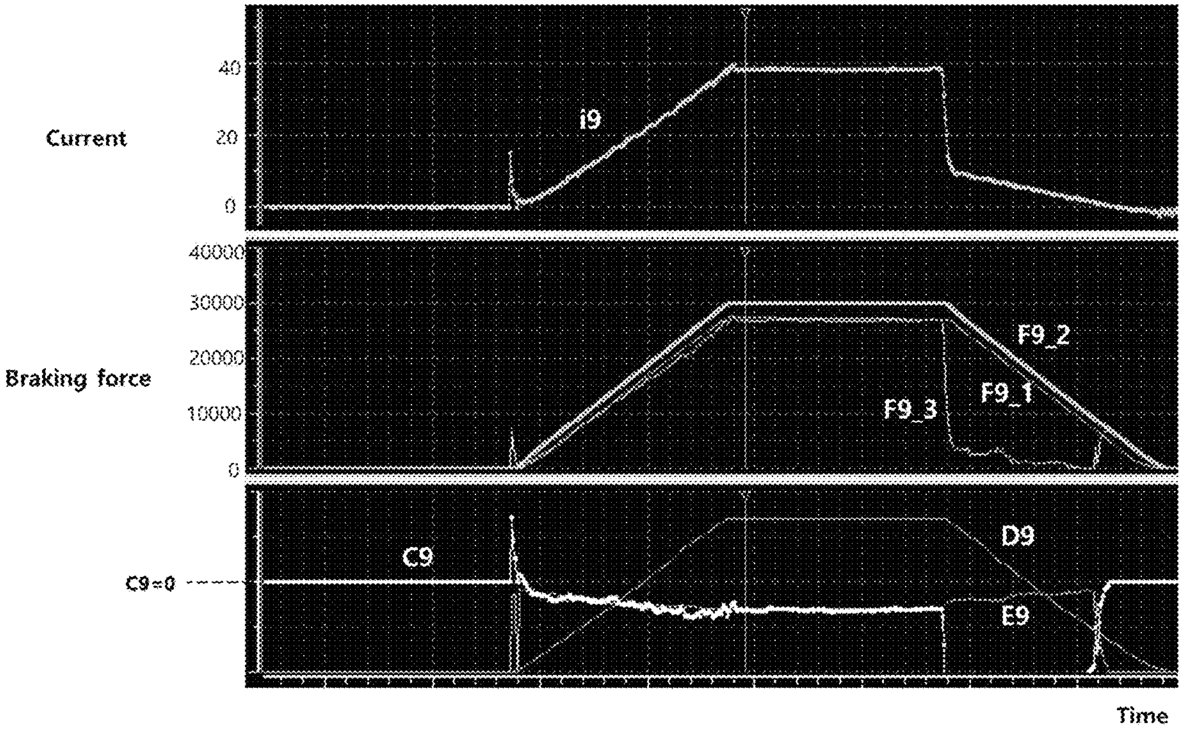
FIG. 9 is a graph illustrating test results when the brake pad is in a wearing state according to an embodiment of the present disclosure.

FIG. 9 is a graph illustrating test results when the brake pad is in a wearing state according to an embodiment of the present disclosure.

Referring to FIGS. 7 to 9, in order to evaluate the accuracy and reliability of actual braking force values F7_3, F8_3, and F9_3 detected by the electro-mechanical brake 1 according to an embodiment of the present disclosure, an experiment for comparing the actual braking force value F7_3, F8_3, and F9_3, sensor braking force values F7_1, F8_1, and F9_1 measured by the force sensor, and first braking force values F7_2, F8_2, and F9_2 from the first map 123 was conducted. In FIGS. 7 to 9, the section in which the electro-mechanical brake 1 is applied is compared with the section in which the current i flowing through the motor 210 and the braking force F increase over time. In FIGS. 7 to 9, the section where the electro-mechanical brake (1) is applied and the current (i) flowing through the motor (210) and the braking force (F) increase over time is described. The force sensor is intended to evaluate the accuracy of the actual braking force values F7_3, F8_3, and F9_3 detected by the electro-mechanical brake 1 according to the present disclosure, and does not correspond to a component of the present invention. A compensation value which is a value obtained by subtracting the first braking force value from the actual braking force value is indicated by C7 to C9.

Referring to FIG. 7, when the state of the brake pad 250 is the full pad state in which the brake pad 250 does not wear, the first braking force value F7_2, the actual braking force value F7_3, and the sensor braking force value F7_1 may substantially match. When the state of the electro-mechanical brake 1 does not change from the first state, the compensation value C7 substantially converges to 0. That is, in the full pad state, the first braking force value F7_2 and the actual braking force value F7_3 may be substantially equal.

Referring to FIG. 8, when the brake pad 250 is expanded, the actual braking force value F8_3 and the sensor braking force value F8_1 substantially match, but the first braking force value F8_2 is smaller than the actual braking force value F8_3 and the sensor braking force value F8_1. In this case, the compensation value C8 is greater than 0. Since the brake pad 250 expands and the stiffness increases, the first braking force value F8_2 should be compensated by the compensation value C8 to detect accurate braking force.

Referring to FIG. 9, when the brake pad 250 wears, an actual braking force value F9_3 and a sensor braking force value F9_1 are substantially equal, but a first braking force value F9_2 is greater than the actual braking force value F9_3 and the sensor braking force value F9_1. The compensation value C8 is smaller than 0. This is because the brake pad 250 wears and the stiffness decreases.

The actual braking force values F7_3, F8_3, and F9_3 detected by the electro-mechanical brake 1 according to the present disclosure illustrated in FIGS. 7 to 9 are substantially equal to the sensor braking force values (F7_1, F8_1, and F9_1). That is, the electro-mechanical brake 1 according to the present disclosure can accurately detect the braking force without a force sensor even when the state is not the first state due to expansion or wearing of the brake pad 250. In addition, even when the calibration cannot be performed because of traveling, it is possible to accurately detect the braking force. The electro-mechanical brake 1 according to the present disclosure is contrasted with the electro-mechanical brake of the related art capable of accurately estimating braking force only in the first state.

Various implementations of systems and techniques described herein may be realized as digital electronic circuits, integrated circuits, field programmable gate arrays (FPGAs), application specific integrated circuits (ASICs), computer hardware, firmware, software, and/or combinations thereof. These various implementations may include one or more computer programs executable on a programmable system. The programmable system includes at least one programmable processor (which may be a special-purpose processor or a general-purpose processor) coupled to receive and transmit data and instructions from and to a storage system, at least one input device, and at least one output device. The computer programs (also known as programs, software, software applications or codes) contain commands for a programmable processor and are stored in a "computer-readable recording medium".

The computer-readable recording medium includes all types of recording devices in which data readable by a computer system is stored. Such a computer-readable recording medium may be a non-volatile or non-transitory medium, such as ROM, CD-ROM, magnetic tape, floppy disk, memory card, hard disk, magneto-optical disk, or a storage device, and may further include a transitory medium such as a data transmission medium. In addition, the computer-readable recording medium may be distributed in a computer system connected via a network, so that computer-readable codes may be stored and executed in a distributed manner.

Various implementations of systems and techniques described herein may be embodied by a programmable computer. Here, the computer includes a programmable processor, a data storage system (including volatile memory, non-volatile memory, or other types of storage systems, or combinations thereof) and at least one communication interface. For example, the programmable computer may be one of a server, a network device, a set top box, an embedded device, a computer expansion module, a personal computer, a laptop, a personal data assistant (PDA), a cloud computing system, or a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An electro-mechanical brake including a piston configured to be driven by a motor to push a brake pad toward a wheel disc of a vehicle, the electro-mechanical brake comprising:

a current detection unit configured to detect a current flowing through the motor;

a position detection unit configured to detect a position of the piston;

a map generating unit configured to generate a first map and a second map in a first state, wherein the first state is a state of the electro-mechanical brake when power is applied to the vehicle at start-up and the state of the electro-mechanical brake changes from the first state when a temperature and volume of the brake pad changes or the brake pad wears, the first map comprises data correlating current flowing through the motor, position of the piston, and braking force with reference to the first state, the second map comprises data of current flowing through the motor and a factor with reference to the first state, and the factor is a ratio of braking force to current flowing through the motor; and a braking force value detection unit configured to detect a braking force value based on a piston position detected by the position detection unit, a current value detected by the current detection unit, the first map, and the second map when braking is performed.

2. The electro-mechanical brake of claim 1, wherein the braking force value detection unit includes a first braking force value determination unit configured to determine a value of braking force output when the piston position is input to the first map, as a first braking force value;

a difference value detection unit configured to detect a difference value between the current value and a value of a current that is output when the piston position is input to the first map; and a compensation value determination unit configured to multiply the difference value by a first factor value to determine a compensation value, wherein the first factor value is output when the current value is input to the second map.

3. The electro-mechanical brake of claim 2, wherein the braking force value detection unit outputs a sum of the compensation value and the first braking force value as the braking force value generated by the electro-mechanical brake when the state of the electro-mechanical brake changes from the first state.

4. The electro-mechanical brake of claim 1, wherein the map generating unit starts to generate the first map and the second map immediately after power is applied to the vehicle at start-up.

5. The electro-mechanical brake of claim 1, wherein the first map comprises a first look-up table correlating current flowing through the motor, position of the piston, and braking force with reference to the first state.

6. The electro-mechanical brake of claim 5, wherein the second map comprises a second look-up table adding the factor for each line of the first look-up table.

7. A control method for an electro-mechanical brake in a vehicle, the electro-mechanical brake including a piston driven by a motor and configured to push a brake pad toward a wheel disc, the control method comprising:

generating a first map in a first state, wherein the first state is a state of the electro-mechanical brake when power is applied to the vehicle at start-up, the state of the electro-mechanical brake changes from the first state when a temperature and volume of the brake pad changes or the brake pad wears, and the first map comprises data correlating current flowing through the motor, a position of the piston, and a braking force relative to the first state;

generating a second map when in the first state wherein the second map comprises data correlating current flowing through the motor and a factor, where the factor is a ratio of the braking force to the current flowing through the motor;

detecting a position of the piston when braking is performed;

detecting a current value flowing through the motor when braking is performed; and detecting a braking force value based on the piston position, the current value, the first map, and the second map.

8. The control method for an electro-mechanical brake of claim 7, wherein detecting of the braking force value includes:

determining a value of braking force output when the piston position is input to the first map, as a first braking force value;

determining a value of a current output when the piston position is input to the first map, as a first current value;

detecting a difference between the current value and the first current value;

determining a value of a factor output when the current value is input to the second map, as a first factor value;

determining a compensation value by multiplying the difference value by the first factor value; and detecting a braking force value by summing the compensation value and the first braking force value.

9. The control method for an electro-mechanical brake of claim 7, wherein generating of the first map in the first state includes:

a first step of performing control so that the current flowing through the motor increases linearly;

a second step of detecting the current flowing through the motor and the position of the piston while performing the first step, and converting a correlation between the current flowing through the motor and the position of the piston into data; and a third step of converting braking force corresponding to the current flowing through the motor and the position of the piston into data.

10. The control method for an electro-mechanical brake of claim 7, wherein generating of the first map in the first state includes:

a first step of performing control so that the position of the piston increases linearly;

a second step of detecting the current flowing through the motor and the position of the piston while performing the first step, and converting a correlation between the current flowing through the motor and the position of the piston into data; and a third step of converting braking force corresponding to the current flowing through the motor and the position of the piston into data.

11. An electro-mechanical brake including a piston configured to be driven by a motor to push a brake pad toward a wheel disc of a vehicle, the electro-mechanical brake comprising:

a current detection unit configured to detect a current flowing through the motor;

a position detection unit configured to detect a position of the piston;

a map generating unit configured to generate a first map and a second map in a first state, wherein the first state is a state of the electro-mechanical brake when power is applied to the vehicle at start-up, the first map comprises data correlating current flowing through the motor, position of the piston, and braking force with reference to the first state, the second map comprises data of current flowing through the motor and a factor with reference to the first state, and the factor is a ratio of braking force to current flowing through the motor; and a braking force value detection unit configured to detect a braking force value based on a piston position detected by the position detection unit, a current value detected by the current detection unit, the first map, and the second map when braking is performed, wherein the braking force value detection unit includes a first braking force value determination unit configured to determine a value of braking force output when the piston position is input to the first map, as a first braking force value;

a difference value detection unit configured to detect a difference value between the current value and a value of a current that is output when the piston position is input to the first map; and a compensation value determination unit configured to multiply the difference value by a first factor value to determine a compensation value, wherein the first factor value is output when the current value is input to the second map; and wherein a decision is made that stiffness of the brake pad has increased when the difference value is greater than 0, and a decision is made that the stiffness of the brake pad has decreased when the difference value is smaller than 0.

* * * * *